(12) United States Patent
Hill

(10) Patent No.: US 6,808,231 B1
(45) Date of Patent: Oct. 26, 2004

(54) SEAT ASSEMBLY

(76) Inventor: Marvin L. Hill, 14247 W. Hawthorne Ave., Lake Forest, IL (US) 60045

( * ) Notice: Subject to any disclaimer, the term of this patent is extended or adjusted under 35 U.S.C. 154(b) by 72 days.

(21) Appl. No.: 10/360,046

(22) Filed: Feb. 10, 2003

(51) Int. Cl.[7] .............................. A47C 7/62; B60N 2/16; B62D 33/08; A10K 97/10
(52) U.S. Cl. ................................ 297/217.7; 297/344.1; 297/344.12; 297/344.13; 297/344.18; 297/188.01; 297/188.08; 297/423.25; 297/423.4; 297/423.19; 297/423.1; 296/65.03; 296/64; 296/26.09; 43/21.2
(58) Field of Search ........................... 297/217.7, 344.1, 297/344.12, 344.13, 344.18, 188.01, 188.08, 423.25, 423.4, 423.19, 423.1; 296/65.03, 63, 64, 65.01, 26.09; 43/21.2

(56) References Cited

U.S. PATENT DOCUMENTS

| | | | | | |
|---|---|---|---|---|---|
| 3,185,305 | A | * | 5/1965 | Silverman | 297/344.18 |
| 3,642,320 | A | * | 2/1972 | Ward | 297/344.18 |
| 3,708,203 | A | * | 1/1973 | Barecki et al. | 297/344.13 |
| 4,086,676 | A | | 5/1978 | Arruza | |
| 4,278,289 | A | * | 7/1981 | Esposito | 297/423.1 X |
| 4,369,902 | A | * | 1/1983 | Lampeas | 296/26.09 |
| 4,426,115 | A | * | 1/1984 | Bissonnette | 297/423.4 X |
| 4,560,200 | A | * | 12/1985 | Giannelli et al. | 297/344.13 |
| 4,620,686 | A | * | 11/1986 | Conant | 297/344.1 |
| 4,645,167 | A | * | 2/1987 | Hardwick | 248/520 |
| 4,709,649 | A | * | 12/1987 | Wann | 297/344.18 X |
| 4,766,838 | A | * | 8/1988 | Johnson | 297/252 X |
| 4,835,896 | A | * | 6/1989 | Bowen | 248/214 X |
| 4,964,233 | A | * | 10/1990 | Benson et al. | 43/21.2 X |
| 5,033,223 | A | * | 7/1991 | Minter | 43/21.2 |
| 5,120,016 | A | * | 6/1992 | Dysarz | 43/21.2 X |
| 5,346,415 | A | * | 9/1994 | Waymon et al. | 440/7 |
| 5,647,161 | A | * | 7/1997 | Miller, Sr. | 297/188.01 X |
| 5,795,017 | A | * | 8/1998 | Zimmerman et al. | 297/344.18 X |
| 5,857,741 | A | | 1/1999 | Anderson | |
| 5,915,976 | A | | 6/1999 | McHugh | |
| 5,992,081 | A | * | 11/1999 | Elkins | 43/21.2 |
| 6,050,627 | A | * | 4/2000 | Lee | 296/26.09 |
| 6,089,652 | A | * | 7/2000 | Miller, Sr. | 43/21.2 X |
| 6,145,929 | A | * | 11/2000 | Gollahon | 297/344.1 |
| 6,155,623 | A | * | 12/2000 | Lane | 296/26.09 |
| 6,431,109 | B1 | * | 8/2002 | Martin | 297/344.12 |
| 6,435,614 | B1 | * | 8/2002 | Gollahon | 297/344.1 |
| 6,631,938 | B1 | * | 10/2003 | Burns | 296/64 |
| 6,662,983 | B2 | * | 12/2003 | Lane et al. | 296/26.09 X |
| 2002/0149249 | A1 | * | 10/2002 | Horn | 297/344.12 |

FOREIGN PATENT DOCUMENTS

GB        2219716 A  * 12/1989  ................. 43/21.2

* cited by examiner

Primary Examiner—Rodney B. White

(57) ABSTRACT

A seat assembly includes a device for releasably mounting to a vehicle trailer hitch. The device includes an elongated member having a first end and a second end. The first end is removably extendable into the trailer hitch. The elongated member has a perpendicular bend therein such that the second end extends upwardly when the first end is inserted into the hitch. A chair assembly is removably attachable to the second end of the elongated member. A footrest assembly is releasably attachable to the elongated member.

11 Claims, 3 Drawing Sheets

SEAT ASSEMBLY

BACKGROUND OF THE INVENTION

1. Field of the Invention

The present invention relates to seating devices and more particularly pertains to a new seating device that provides a user with a convenient accessory to provide convenience and comfort for bank or shore fisherman.

2. Description of the Prior Art

The use of seating devices is known in the prior art. U.S. Pat. No. 5,587,741 describes a tailgate table and chairs that can be mounted to a trailer hitch to be used during tailgate parties. Another type tailgate device is U.S. Pat. No. 5,815,976 describing a fishing rod holder securable to the bumper of a vehicle. U.S. Pat. No. 4,086,676 describes an auxiliary sport fishing chair for mounting in a boat.

While these devices fulfill their respective, particular objectives and requirements, the need remains for a device that enables a fisherman to fish conveniently and comfortably from shore.

SUMMARY OF THE INVENTION

The present invention meets the needs presented above by incorporating a vehicle hitch mounted adjustable seat assembly fishing rod and drink holder apparatus.

Another object of the present invention is to provide a new seating device that would eliminate the need for a user to carry a variety of fishing gear to a particular spot, thereby saving time and effort.

Still another object of the present invention is to provide a new seating device that would allow the elderly to fish their favorite spots without having to climb steep or rocky banks.

To this end, the present invention generally comprises a device for releasably mounting to a vehicle trailer hitch. The device includes an elongated member having a first end and a second end. The first end is removably extendable into the trailer hitch. The elongated member has a perpendicular bend therein such that the second end extends upwardly when the first end is inserted into the hitch. A chair assembly is removably attachable to the second end of the elongated member. A footrest assembly is releasably attachable to the elongated member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
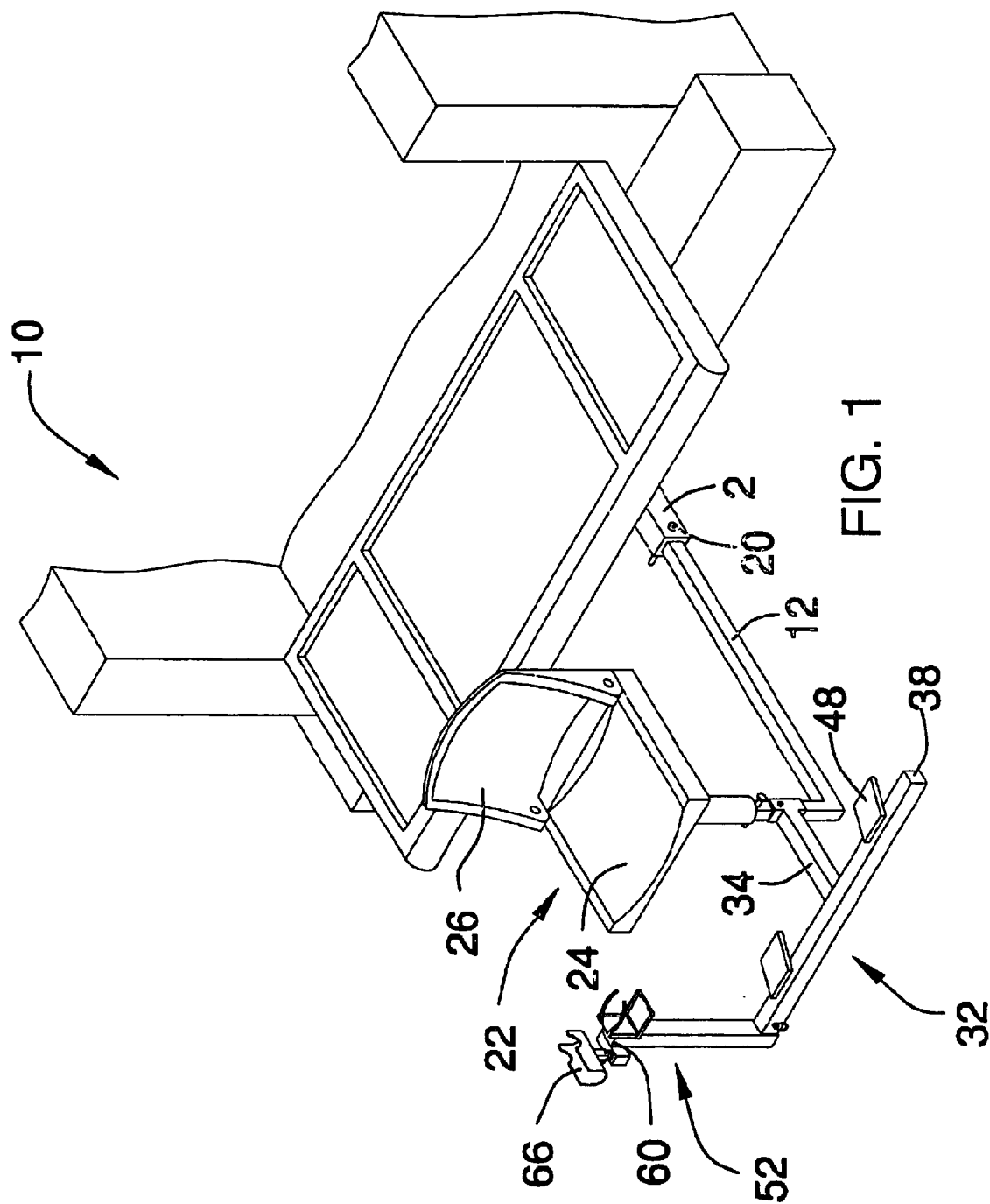
FIG. 1 is a perspective view of a seat assembly according to the present invention.
Figure 2:
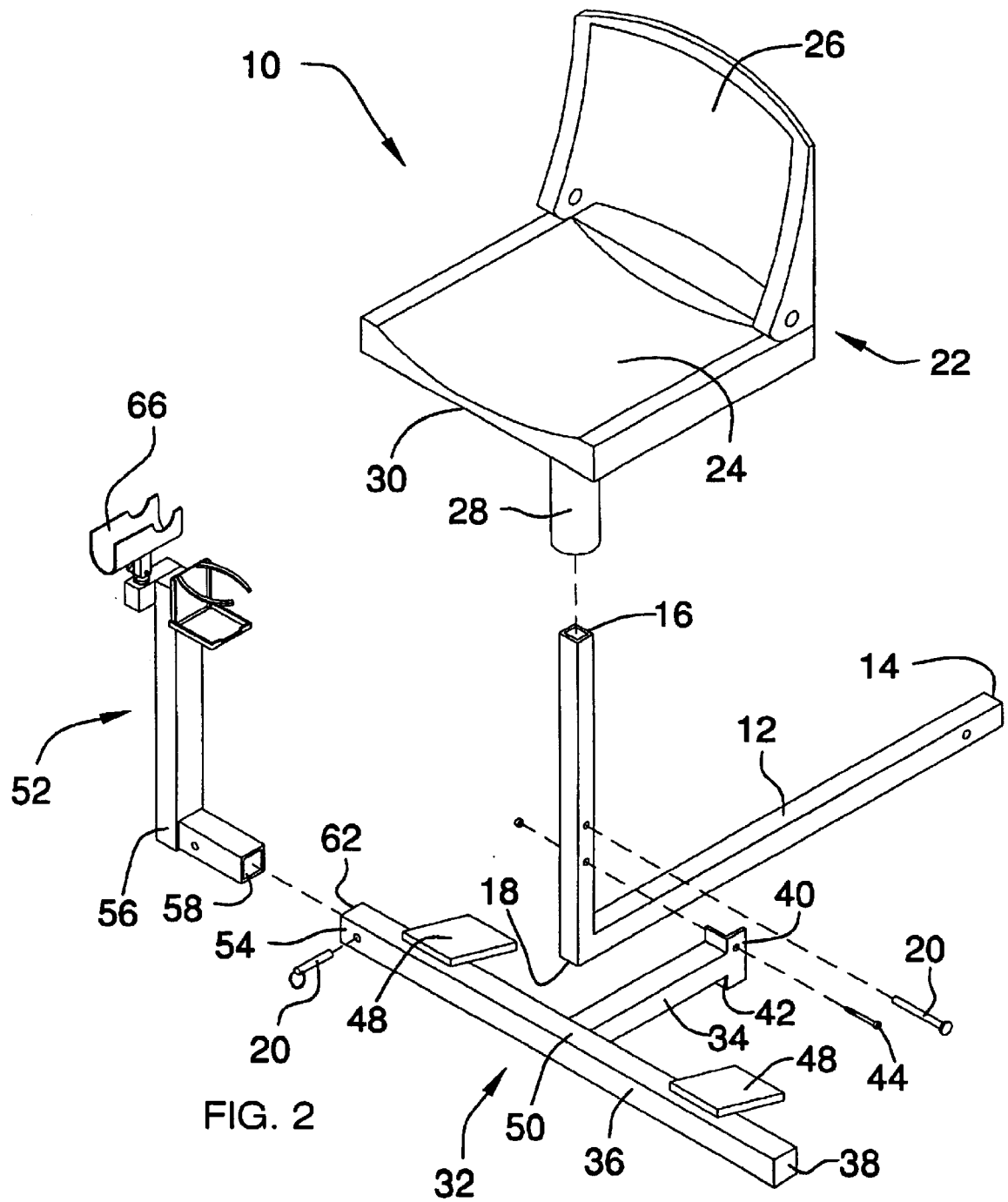
FIG. 2 is an expanded view of the present invention.
Figure 3:
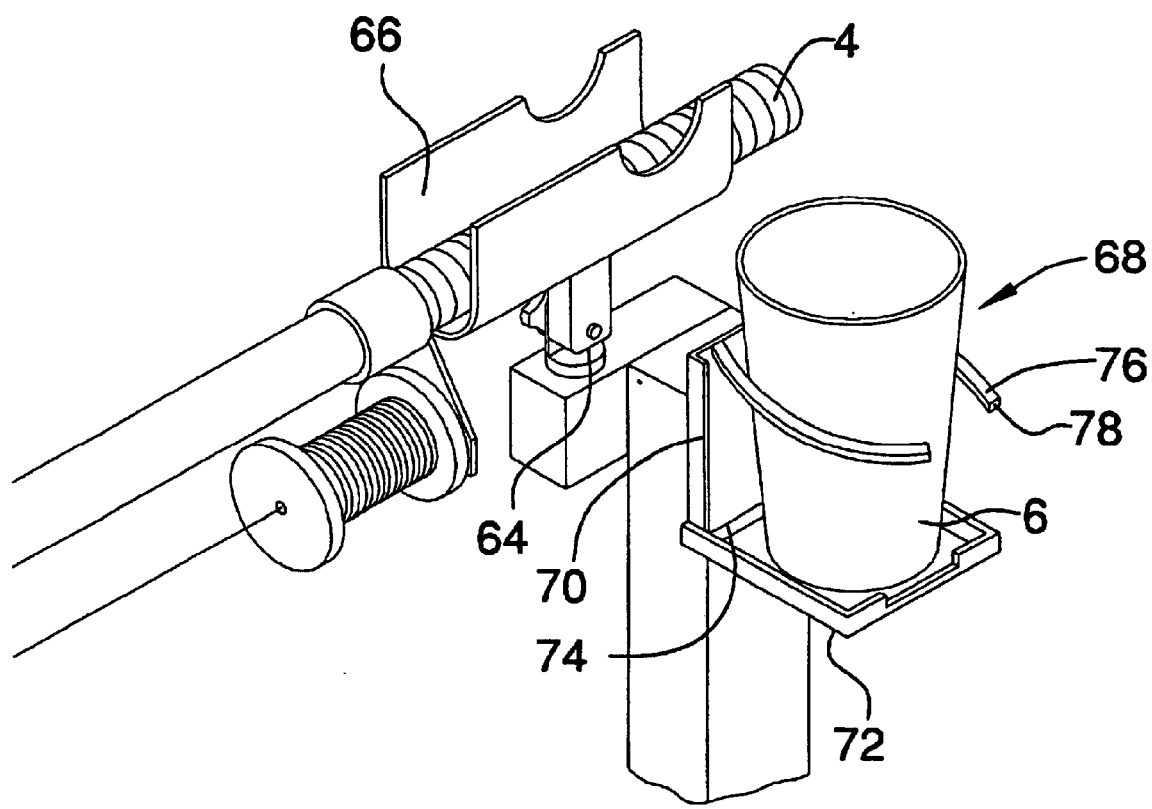
FIG. 3 is a perspective view of the present invention.

With reference now to the drawings, and in particular to FIGS. 1 through 3 thereof, a new seating device embodying the principles and concepts of the present invention and generally designated by the reference numeral 10 will be described.

As best illustrated in FIGS. 1 through 3, the seat assembly 10 comprises a device, which is releasably mountable to a vehicle trailer hitch 2. The device comprises an elongated member 12 having a first end 14 and a second end 16. The first end 14 is removably extendable into the trailer hitch 2. The elongated member 12 has a perpendicular bend 18 therein such that the second end 16 extends upwardly when the first end 14 is inserted into the hitch 2. A pin 20 is extendable into the hitch 2 and through the elongated member 12 to hold the elongated member 12 in place.

A chair assembly 22 includes a seat 24 and a backrest 26. The backrest 26 is attached to and extends upwardly from the seat 24. A coupler 28 is attached to a bottom surface 30 of the seat 24 for releasably coupling the seat 24 to the second end 16 of the elongated member 12. Pins 20 may be extendable through the elongated member 12 for adjusting the height of the chair assembly 22.

A footrest assembly 32 is releasably attachable to the elongated member 12. The footrest assembly 32 includes a first bar 34 and a second bar 36 that is attached to the first bar 34 at a perpendicular angle. The second bar 36 has a pair of opposite ends 38. The first bar 34 is located on the second bar 36. A bracket 40 is attached to a free end 42 of the first bar 34. The bracket 40 is removably positioned on the elongated member 12 between the second end 16.and the bend 18 in the elongated member 12. A securing member 44 is adapted for releasably securing the bracket 40 to the elongated member 12. The securing member 44 preferably comprises a bolt that is extendable through the bracket 40 and into the elongated member 12.

A pair of panels 48 is preferably attached to an upper surface 50 of the second bar 36. The panels 48 are positioned on either side of the first bar 34. Each of the panels 48 is angled in a manner such that they extend downward toward a person sitting in the chair assembly 22 when the footrest 32 is attached to the elongated member 12.

A pole holding assembly 52 for holding a fishing pole 4 is releasably attachable to the footrest 54. The pole holding assembly 52 includes a support 56 comprising an L-shaped bar having a lower free end 58 an upper free end 60. The lower free end 58 is removably extendable into a first one of the opposite ends 62 of the second bar 36. A pivot member 64 pivotally attaches a saddle 66 to the upper free end 60. The saddle 66 is adapted for selectively receiving a fishing pole 4. Ideally the saddle 66 can be pivoted upwardly or downwardly as needed by the user. A pin 20 is removably extendable through the support 56 and second bar 36 for securing the support 56 in place.

A cup holder 68 is attached to the pole holding assembly 52. The cup holder 68 includes a vertical plate 70 and a horizontal plate 72 that is attached to and extends along a bottom edge 74 of the vertical plate 70. A loop member 76 is attached to the vertical plate 70 and extends over the horizontal plate 72. The loop member 76 may have a break 78 therein for facilitating different sized cups 6.

In use, the seat assembly 10 is attached to a hitch 2 of a vehicle parked adjacent to a body of water. The user sits on the chair assembly 22 and places their feet on the panels 48. A fishing pole 4 may be placed in the saddle 66 and a drink in the cup holder 68. By this construction, the device offers a comfortable position from where to fish.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seat device for releasably mounting to a vehicle trailer hitch, said device comprising:

an elongated member having a first end and a second end, said first end being adapted to be removably extendable into the trailer hitch, said elongated member having a perpendicular bend therein such that said second end extends upwardly when said first end is inserted into said hitch;

a chair assembly being removably attachable to said second end of said elongated member; and a footrest assembly being releasably attachable to said elongated member, wherein said footrest assembly includes a first bar and a second bar being attached to said first bar at a perpendicular angle, said second bar having a pair of opposite ends, a bracket being attached to a free end of said first bar, said bracket being removably positioned on said elongated member between said second end and said bend in said elongated member, a securing member being adapted for releasably securing said bracket to said elongated member.

2. The seat device of claim 1, wherein said chair assembly includes a seat and a backrest, said backrest being attached to and extending upwardly from said seat, a coupler being attached to a bottom surface of said seat for releasably coupling said seat to said second end of said elongated member.

3. The seat device of claim 1, further including a pair of panels being attached to an upper surface of said second bar, said panels being positioned on either side of said first bar.

4. The seat device of claim 1, further including a pole holding assembly being releasably attachable to said footrest.

5. The seat device of claim 4, wherein said pole holding assembly includes a support comprising an L-shaped bar having a lower free end and an upper free end, said lower free end being removably extendable into a first one of said opposite ends of said second bar, a saddle being pivotally attached to said upper free end, said saddle being adapted for selectively receiving a fishing pole.

6. The seat device of claim 5, further including a cup holder being attached to said pole holding assembly.

7. The seat device of claim 6, wherein said cup holder includes a vertical plate and a horizontal plate being attached to and extending along a bottom edge of said vertical plate, a loop member being attached to said vertical plate and extending over said horizontal plate.

8. The seat device of claim 1, further including:

a pair of panels being attached to an upper surface of said second bar, said panels being positioned on either side of said first bar, each of said panels being angled;

said chair assembly including a seat and a backrest, said backrest being attached to and extending upwardly from said seat, a coupler being attached to a bottom surface of said seat for releasably coupling said seat to said second end of said elongated member;

a pole holding assembly being releasably attachable to said footrest, said pole holding assembly including;

a support comprising an L-shaped bar having a lower free end an upper free end, said lower free end being removably extendable into a first one of said opposite ends of said second bar, and a saddle being pivotally attached to said upper free end, said saddle being adapted for selectively receiving a fishing pole; and a cup holder being attached to said pole holding assembly, said cup holder including a vertical plate and a horizontal plate being attached to and extending along a bottom edge of said vertical plate, a loop member being attached to said vertical plate and extending over said horizontal plate.

9. A seat device for releasably mounting to a vehicle trailer hitch, said device comprising:

an elongated member having a first end and a second end, said first end being adapted to be removably extendable into the trailer hitch, said elongated member having a perpendicular bend therein such that said second end extends upwardly when said first end is inserted into said hitch;

a chair assembly being removably attachable to said second end of said elongated member; and a footrest assembly being releasably attachable to said elongated member, a pole holding assembly being releasably attachable to said footrest, said pole holding assembly including a support comprising an L-shaped bar having a lower free end and an upper free end, said lower free end being removably extendable into a first one of said opposite ends of said second bar, a saddle being pivotally attached to said upper free end, said saddle being adapted for selectively receiving a fishing pole.

10. The seat device of claim 9, further including a cup holder being attached to said pole holding assembly.

11. The seat device of claim 10, wherein said cup holder includes a vertical plate and a horizontal plate being attached to and extending along a bottom edge of said vertical plate, a loop member being attached to said vertical plate and extending over said horizontal plate.

* * * * *